US012572097B2

(12) United States Patent
Matsubara et al.

(10) Patent No.: US 12,572,097 B2
(45) Date of Patent: Mar. 10, 2026

(54) FIXING DEVICE AND IMAGE FORMING APPARATUS

(71) Applicant: FUJIFILM Business Innovation Corp., Tokyo (JP)

(72) Inventors: Takashi Matsubara, Kanagawa (JP); Takashi Ohashi, Kanagawa (JP); Takuma Ishihara, Kanagawa (JP); Hina Saito, Kanagawa (JP)

(73) Assignee: FUJIFILM Business Innovation Corp., Minato-ku (JP)

( * ) Notice: Subject to any disclaimer, the term of this patent is extended or adjusted under 35 U.S.C. 154(b) by 370 days.

(21) Appl. No.: 18/119,019

(22) Filed: Mar. 8, 2023

(65) Prior Publication Data

US 2024/0103416 A1 Mar. 28, 2024

(30) Foreign Application Priority Data

Sep. 28, 2022 (JP) ................................. 2022-155015

(51) Int. Cl.
*G03G 15/20* (2006.01)

(52) U.S. Cl.
CPC ..... *G03G 15/2053* (2013.01); *G03G 15/2064* (2013.01); *G03G 2215/2032* (2013.01); *G03G 2215/2041* (2013.01)

(58) Field of Classification Search
CPC ........... G03G 15/2053; G03G 15/2041; G03G 15/2032
See application file for complete search history.

(56) References Cited

U.S. PATENT DOCUMENTS 10,627,750 B1 * 4/2020 Ando ................. G03G 15/2039

FOREIGN PATENT DOCUMENTS

| | | |
|---|---|---|
| JP | 2006-78612 A | 3/2006 |
| JP | 2013-57708 A | 3/2013 |
| JP | 5899003 B2 | 4/2016 |

* cited by examiner

*Primary Examiner* — Minh Q Phan
(74) *Attorney, Agent, or Firm* — Sughrue Mion, PLLC

(57) ABSTRACT

A fixing device includes an endless belt, multiple stretchers that stretch the belt, a heater that heats the belt including sections, section by section, sectioned in a direction crossing a rotation direction of the belt, and a switch that switches the sections heated by the heater from one to another in accordance with a position of an edge portion of the belt in the direction crossing the rotation direction of the belt.

17 Claims, 8 Drawing Sheets

FIXING DEVICE AND IMAGE FORMING APPARATUS

CROSS-REFERENCE TO RELATED APPLICATIONS

This application is based on and claims priority under 35 USC 119 from Japanese Patent Application No. 2022-155015 filed Sep. 28, 2022.

BACKGROUND

(i) Technical Field

The present disclosure relates to a fixing device and an image forming apparatus.

(ii) Related Art

For example, Japanese Patent No. 5899003, Japanese Unexamined Patent Application Publication No. 2006-078612, and Japanese Unexamined Patent Application Publication No. 2013-057708 have described the technology relating to a fixing device.

Japanese Patent No. 5899003 describes a fixing device including a fixing roller, a pressing roller, a fixing belt, and a heating member. The fixing belt is stretched between the fixing roller and the heating member spaced a predetermined distance apart from each other to be rotatable with rotation of the fixing roller. The heating member is in contact with the fixing belt to heat the fixing belt. The pressing roller faces the fixing roller to be in pressure contact with a surface of the fixing belt that is in contact with the fixing roller. The heating member includes a base member having a semi-cylindrical surface, resistance heaters embedded in multiple recesses arranged in a grid pattern in the surface of the base member to generate heat, and a first insulation layer formed to cover the entire surface of the base member. A heat-insulating layer, a second insulation layer, and the resistance heaters are disposed in this order on the bottom surfaces of the recesses in the base member. The fixing belt is heated by the resistance heaters by coming into contact with the semi-cylindrical surface of the base member in the heating member. The fixing belt rotates the fixing roller and the pressing roller to fix an image, with heat from the heated fixing belt and a pressure from the fixing roller and the pressing roller, on a recording sheet transported to a fixing nip where the fixing belt and the pressing roller are in contact with each other.

Japanese Unexamined Patent Application Publication No. 2006-078612 describes a belt driving device that includes (a) multiple rollers, (b) a belt stretched between the rollers, (c) a driver coupled with at least one of the rollers and driving the belt by rotating the roller, and (d) a restricting member disposed at at least one of edge portions of a predetermined one of the rollers to restrict a positional deviation of the belt in an axial direction, and restrict swelling of an edge portion of the belt outward in a radial direction.

Japanese Unexamined Patent Application Publication No. 2013-057708 describes a fixing device that includes an endless fixing belt that comes into contact with a toner image on a receiving member to fix the toner image to the receiving member, a heating roller that heats the fixing belt, a fixing roller that stretches the endless fixing belt together with the heating roller and includes a silicone rubber layer that comes into contact with the toner image on the receiving member with the fixing belt interposed therebetween, a pressing roller that comes into pressure contact with the fixing roller with the fixing belt interposed therebetween, and a deviation prevention member that presses, from the sheet receiving side of the fixing belt against the fixing roller, an edge portion of the fixing belt toward which the fixing belt deviates from the longitudinal direction of the fixing roller.

SUMMARY

Aspects of non-limiting embodiments of the present disclosure relate to reduction of a temperature rise of a belt, when the belt has shifted to an edge portion in a direction crossing a rotation direction, at an edge portion opposite to the edge portion toward which the belt has shifted.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a fixing device that includes an endless belt, multiple stretchers that stretch the belt, a heater that heats the belt including sections, section by section, sectioned in a direction crossing a rotation direction of the belt, and a switch that switches the sections heated by the heater from one to another in accordance with a position of an edge portion of the belt in the direction crossing the rotation direction of the belt.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
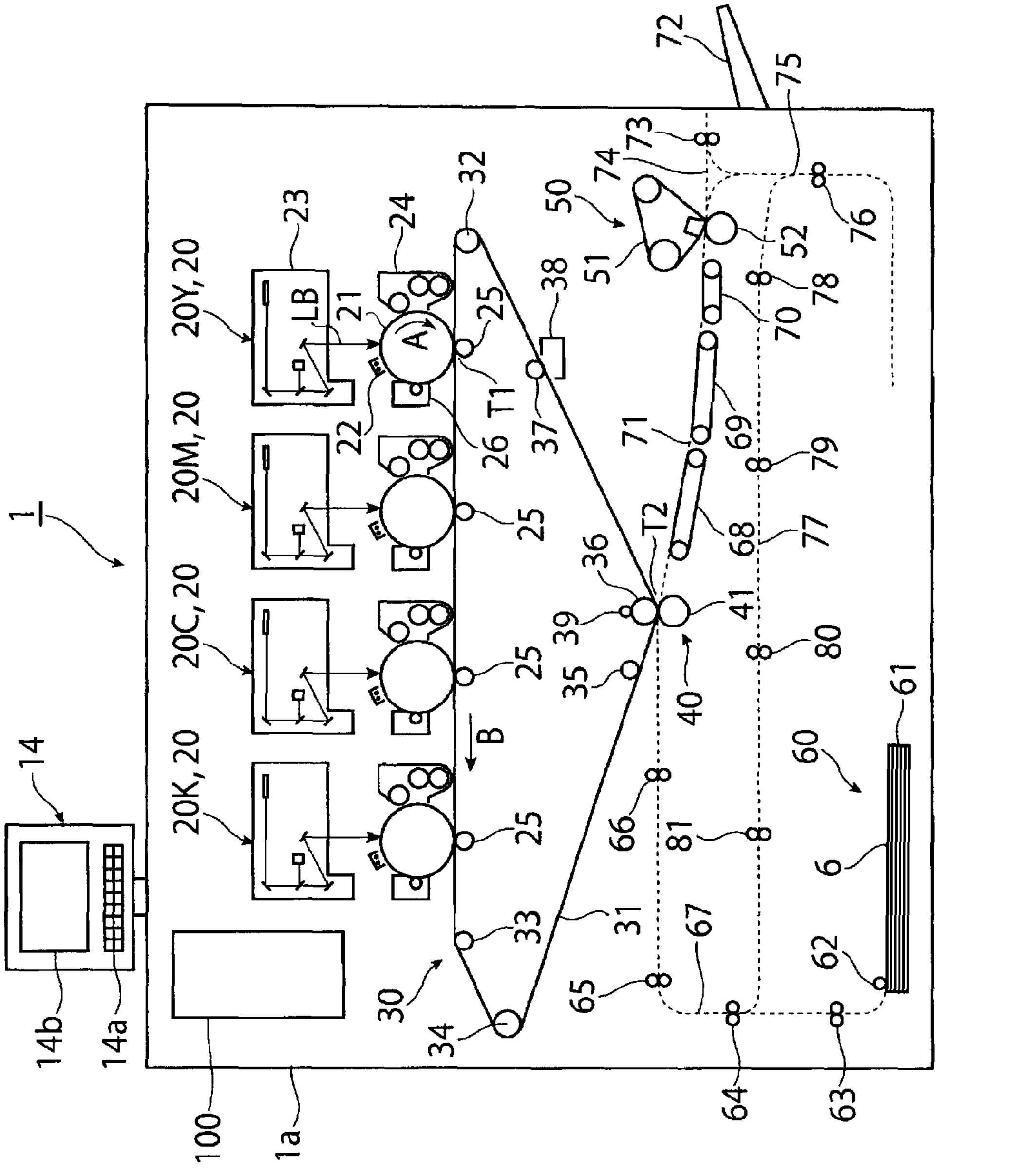
FIG. 1 is a diagram of the entire structure of an image forming apparatus to which a fixing device according to a first exemplary embodiment of the present disclosure is applied.

FIG. 1 is a diagram of the entire structure of an image forming apparatus including a fixing device according to a first exemplary embodiment of the present disclosure.

Entire Structure of Image Forming Apparatus

An image forming apparatus 1 according to a first exemplary embodiment is formed as, for example, a color printer. As illustrated in FIG. 1, the image forming apparatus 1 includes components including multiple image forming devices 20 that form toner images developed with toner serving as a developer, an intermediate transfer device 30 that holds the toner images formed by the image forming devices 20 and finally transports the toner images to a second transfer position where the toner images are second-transferred to recording sheets 6 serving as an example of recording media (sheets), a sheet feeding device 60 that accommodates and transports the predetermined recording sheets 6 to be fed to the second transfer position of the intermediate transfer device 30, and a fixing device 50 serving as a fixing unit that fixes the toner image on each recording sheet 6 second-transferred by the intermediate transfer device 30 onto the recording sheet 6. An apparatus body 1*a* includes, for example, a support structure member and an outer cover.

In the first exemplary embodiment, the multiple image forming devices 20 and the intermediate transfer device 30 constitute an image forming unit that forms toner images on the recording sheets 6. Alternatively, the image forming unit may naturally include a single image forming device that directly forms a toner image on a recording medium without using the intermediate transfer device.

As illustrated in FIG. 1, the image forming apparatus 1 includes the four image forming devices 20 arranged in a line in the horizontal direction in the internal space of the apparatus body 1*a*. The four image forming devices 20 are image forming devices 20Y, 20M, 20C, and 20K that dedicatedly form color toner images corresponding to respective colors of yellow (Y), magenta (M), cyan (C), and black (K).

The image forming devices 20 (20Y, 20M, 20C, and 20K) basically have the same structure. Each of the image forming devices 20 (20Y, 20M, 20C, and 20K) includes components including a photoconductor drum 21 serving as an example of an image carrier that rotates in a direction indicated with arrow A, a charging device 22 that electrically charges, with a predetermined potential, the circumferential surface (the image holding surface) of the photoconductor drum 21 on which an image is formed, an exposure device 23 serving as an example of an exposure unit that forms an electrostatic image (for the corresponding color) having a potential difference by irradiating the electrically charged circumferential surface of the photoconductor drum 21 with a light beam LB based on information (a signal) of the image, a developing device 24 serving as a developing unit that develops the electrostatic image with toner in a developer of the corresponding color (Y, M, C, or K) into a toner image, a first transfer device 25 serving as an example of a first transfer unit that transfers each toner image to the intermediate transfer device 30, and a drum cleaning device 26 that cleans the photoconductor drum 21 by removing extraneous matter such as toner left and adhering to the image holding surface of the photoconductor drum 21 after first transfer. Broken lines in the drawing indicate transport paths along which the recording sheets 6 are transported in the apparatus body 1*a*.

The intermediate transfer device 30 is disposed below the image forming devices 20 (20Y, 20M, 20C, and 20K). The intermediate transfer device 30 includes an intermediate transfer belt 31 that circularly moves in a direction of arrow B while passing through first transfer positions T1 located below the photoconductor drums 21 of the image forming devices 20 (20Y, 20M, 20C, and 20K). At the first transfer positions T1, the first transfer devices 25 (first transfer rollers) are in contact with the circumferential surfaces of the photoconductor drums 21 with the intermediate transfer belt 31 interposed therebetween. Each first transfer device 25 receives a first transfer bias voltage with a polarity opposite to the polarity of the toner image on the photoconductor drum 21 from a high voltage power supply not illustrated. The intermediate transfer belt 31 is circularly movably supported by multiple belt support rollers 32 to 37 on the inner circumference to be held in an intended state. In the multiple belt support rollers 32 to 37, the belt support roller 32 serves as a driving roller, the belt support rollers 33 and 35 serve as driven rollers that hold the intermediate transfer belt 31 in, for example, the traveling position, the belt support roller 34 serves as a tensioning roller, the belt support roller 36 serves as a second-transfer back-up roller, and the belt support roller 37 serves as a support roller of a belt cleaning device 38.

A second transfer device 40 that second-transfers the toner images on the intermediate transfer belt 31 to the recording sheets 6 is disposed on the outer circumferential surface (the image holding surface) of the intermediate transfer belt 31 supported by the belt support roller 36. The second transfer device 40 is a contact transfer device including the belt support roller 36 that supports the intermediate transfer belt 31 at a second transfer position T2, and a second transfer roller 41 that rotates while being in contact with a portion of the outer circumferential surface of the intermediate transfer belt 31 supported by the belt support roller 36. In the first exemplary embodiment, the second transfer roller 41 is grounded. The belt support roller 36 receives a predetermined second transfer bias voltage with a negative polarity, the same as the polarity with which the toner is charged, from a high voltage power supply not illustrated through a bias application roller 39. The belt cleaning device 38 is disposed on the intermediate transfer belt 31 downstream from the second transfer device 40. The belt cleaning device 38 cleans the intermediate transfer belt 31 by removing extraneous matter such as toner or paper dust left on and adhering to the surface of the intermediate transfer belt 31. In the first exemplary embodiment, the second transfer roller 41 is grounded, and the belt support roller 36 receives a predetermined second transfer bias voltage with a negative polarity the same as the polarity with which toner is charged, but this structure is not the only possible example. Alternatively, the belt support roller 36 may be grounded, and the second transfer roller 41 may receive a predetermined second transfer bias voltage with a positive polarity opposite to the polarity with which toner is charged.

The fixing device 50 includes components such as a heating belt 51 that is heated by a heater (heat source) to keep the surface temperature at a predetermined temperature, and a pressing roller 52 that rotates while being in contact with the heating belt 51 with a predetermined pressure. In this fixing device 50, a contact portion where the heating belt 51 and the pressing roller 52 are in contact serves as a fixing nip where a predetermined fixing process (heating and pressing) is performed. The fixing device will be described below in detail.

The sheet feeding device 60 is disposed below the intermediate transfer device 30. The sheet feeding device 60 roughly includes one sheet container (or multiple sheet containers) 61 that accommodates a stack of recording sheets 6 of an intended size or an intended type, and a pick-up device 62 that picks up the recording sheets 6 one by one from the sheet container 61. The sheet container 61 is attached to be drawn out to, for example, the front of the apparatus body 1*a* (the side that a user faces when operating the image forming apparatus 1).

Examples of the recording sheets 6 include thin paper sheets including ordinary sheets or tracing paper sheets used for, for example, an electrophotographic copying machine or a printer, and overhead projector (OHP) sheets formed from transparent film media made of a synthetic resin (such as polyethylene terephthalate (PET)). To further improve the smoothness of the image surface that has undergone fixing, the surface of the recording sheet 6 is preferably as smooth as possible. For example, a coated paper sheet obtained by coating either one or both of the top and back surfaces of an ordinary sheet with resin or another material is preferably usable.

A fed-sheet transport path 67 is disposed between the sheet feeding device 60 and the second transfer device 40. The fed-sheet transport path 67 includes one or more pairs of sheet transport rollers 63 to 66 that transport the recording sheets 6 fed from the sheet feeding device 60 to the second transfer position T2, and a transport guide member not illustrated. The pair of sheet transport rollers 66 disposed at a position immediately in front of the second transfer position T2 on the fed-sheet transport path 67 serve as, for example, rollers (registration rollers) that adjust the timing to transport the recording sheets 6.

A sheet transport path 71 including multiple sheet transport belts 68, 69, and 70 (or one sheet transport belt) that transport the recording sheets 6 fed from the second transfer device 40 to the fixing device 50 is disposed between the second transfer device 40 and the fixing device 50.

A discharging transport path 74 is disposed downstream from the fixing device 50. The discharging transport path 74 includes sheet discharging rollers 73 that discharge the recording sheet 6 to which a toner image is fixed by the fixing device 50 to a sheet discharge portion 72 disposed on the side surface of the apparatus body 1*a*.

A reverse transport path 75 that allows the recording sheets 6 to be turned upside down diverges downward from a portion of the discharging transport path 74. A switching member not illustrated that switches the transport direction of the recording sheets 6 is disposed at the divergence point of the discharging transport path 74. A pair of reverse rollers 76 capable of switching the rotation direction between a forward rotation direction and a reverse rotation direction are disposed on the reverse transport path 75. A both-side transport path 77 that diverges leftward from a portion above the pair of reverse rollers 76 is connected with the reverse transport path 75. Multiple pairs of both-side transport rollers 78 to 81 that transport the upside-down recording sheets 6 to the fed-sheet transport path 67 and a transport guide member not illustrated are disposed on the both-side transport path 77.

FIG. 1 also illustrates a controller 100 serving as an example of a control unit that generally controls the operations of the image forming apparatus 1, and an operating device 14 that operates the image forming apparatus 1. The operating device 14 includes an operation panel 14*a* that receives inputs of the type of the recording sheets 6 or the number of recording sheets to be recorded, and a display panel 14*b* that displays the inputs of the type of the recording sheets 6 or the number of recording sheets to be recorded.

Operation of Image Forming Apparatus A basic image forming operation performed by the image forming apparatus 1 will be described below.

An image forming operation performed to form a full-color image with a combination of four-color (Y, M, C, and K) toner images using the four image forming devices 20 (20Y, 20M, 20C, and 20K) will be described below.

When the image forming apparatus 1 receives request command information for an image forming operation (print) through the operating device 14, the controller 100 controls components including the four image forming devices 20 (20Y, 20M, 20C, and 20K), the intermediate transfer device 30, the second transfer device 40, the fixing device 50, and the sheet feeding device 60 to actuate the components.

In each of the image forming devices 20 (20Y, 20M, 20C, and 20K), the photoconductor drum 21 rotates in a direction of arrow A, and the charging device 22 electrically charges the surface of the photoconductor drum 21 with an intended polarity (a negative polarity in the first exemplary embodiment) and an intended potential. Subsequently, the exposure device 23 exposes the electrically charged surface of the photoconductor drum 21 with a light beam LB emitted based on an image signal obtained by converting image information input to the image forming apparatus 1 into a corresponding color component (Y, M, C, or K) to form, on the surface, an electrostatic image of the color component formed by a predetermined potential difference.

Subsequently, each of the developing devices 24 develops the electrostatic image of the color component formed on the photoconductor drum 21 by electrostatically adhering toner of the corresponding color (Y, M, C, or K) electrically charged with the intended polarity (negative polarity) to the electrostatic image. With this development, the electrostatic image of the color component formed on the photoconductor drum 21 is developed with toner of the corresponding color and formed into a toner image of any of four colors (Y, M, C, and K) as a visible image.

Subsequently, when the toner image of the corresponding color formed on the photoconductor drum 21 of each of the image forming devices 20 (20Y, 20M, 20C, and 20K) is transported to the first transfer position T1, the first transfer device 25 first-transfers the toner image of the corresponding color to sequentially overlap the toner image on the intermediate transfer belt 31 in the intermediate transfer device 30 that rotates in the direction of arrow B.

In each image forming device 20 that has finished first transfer, the drum cleaning device 26 scratches off extraneous matter to clean the surface of the photoconductor drum 21. Thus, each image forming device 20 is prepared for the next image forming operation.

Subsequently, the intermediate transfer device 30 holds the first-transferred toner image and transports the toner image to the second transfer position T2 with rotation of the intermediate transfer belt 31. The sheet feeding device 60 feeds an intended recording sheet 6 to the fed-sheet transport path 67 in accordance with the image forming operation. On the fed-sheet transport path 67, the pair of sheet transport rollers 66 serving as registration rollers feed the recording sheet 6 to the second transfer position T2 in accordance with transfer timing.

At the second transfer position T2, the second transfer roller 41 collectively second-transfers the toner images on the intermediate transfer belt 31 to the recording sheet 6. In the intermediate transfer device 30 that has finished second transfer, the belt cleaning device 38 removes extraneous matter such as toner left on the surface of the intermediate transfer belt 31 after second transfer to clean the intermediate transfer belt 31.

Subsequently, after being released from the intermediate transfer belt 31 and the second transfer roller 41, the recording sheet 6 to which the toner image is second-transferred is transported to the fixing device 50 by the sheet transport belts 68, 69, and 70. The fixing device 50 introduces the second-transferred recording sheet 6 into the fixing nip between the rotating heating belt 51 and the rotating pressing roller 52 to allow the recording sheet 6 to pass through the fixing nip to fix an unfixed toner image to the recording sheet 6 through a fixing process (heating and pressing).

The recording sheet 6 that has undergone the fixing process is discharged by the sheet discharging rollers 73 through the discharging transport path 74 to the sheet discharge portion 72 disposed on the side surface of the image forming apparatus 1.

When the image forming apparatus 1 is to form images on both surfaces of the recording sheet 6, a switching member not illustrated switches the transport path for the recording sheet 6 from the discharging transport path 74 to the reverse transport path 75 without the sheet discharging rollers 73 discharging the recording sheet 6 having an image on one surface to the sheet discharge portion 72. While the recording sheet 6 guided to the reverse transport path 75 has the trailing end held between the pair of reverse rollers 76, the pair of reverse rollers 76 have their rotation direction switched from the forward rotation direction to the reverse rotation direction to transport the recording sheet 6 to the both-side transport path 77 while the recording sheet 6 is turned upside down. The recording sheet 6 transported to the both-side transport path 77 is transported to the fed-sheet transport path 67 by multiple pairs of both-side transport rollers 78 to 81, and receives toner images on the back surface from the intermediate transfer belt 31. Thereafter, the recording sheet 6 is transported to the fixing device 50 to have the toner image transferred to the back surface fixed (heated and pressed) by the fixing device 50, and is then discharged to the sheet discharge portion 72 by the sheet discharging rollers 73 through the discharging transport path 74.

With the above operation, a full-color image formed with a combination of toner images of toner of the four colors (Y, M, C, and K) is formed on at least one of the surfaces of the recording sheet 6. When receiving a request command for performing the image forming operation for multiple sheets, the image forming apparatus 1 similarly performs the image forming operation for the multiple sheets. Besides forming a full-color image in the above manner, the image forming apparatus 1 also forms, on the recording sheet 6, an image with an appropriate combination of toner images of one to three colors including a monochrome image through the similar image forming operation by forming the toner images with one to three image forming devices.

Structure of Fixing Device

The image forming apparatus 1 with the above structure includes the fixing device 50 serving as an example of a fixing unit that fixes the image formed on the surface of the recording medium.

Figure 2:
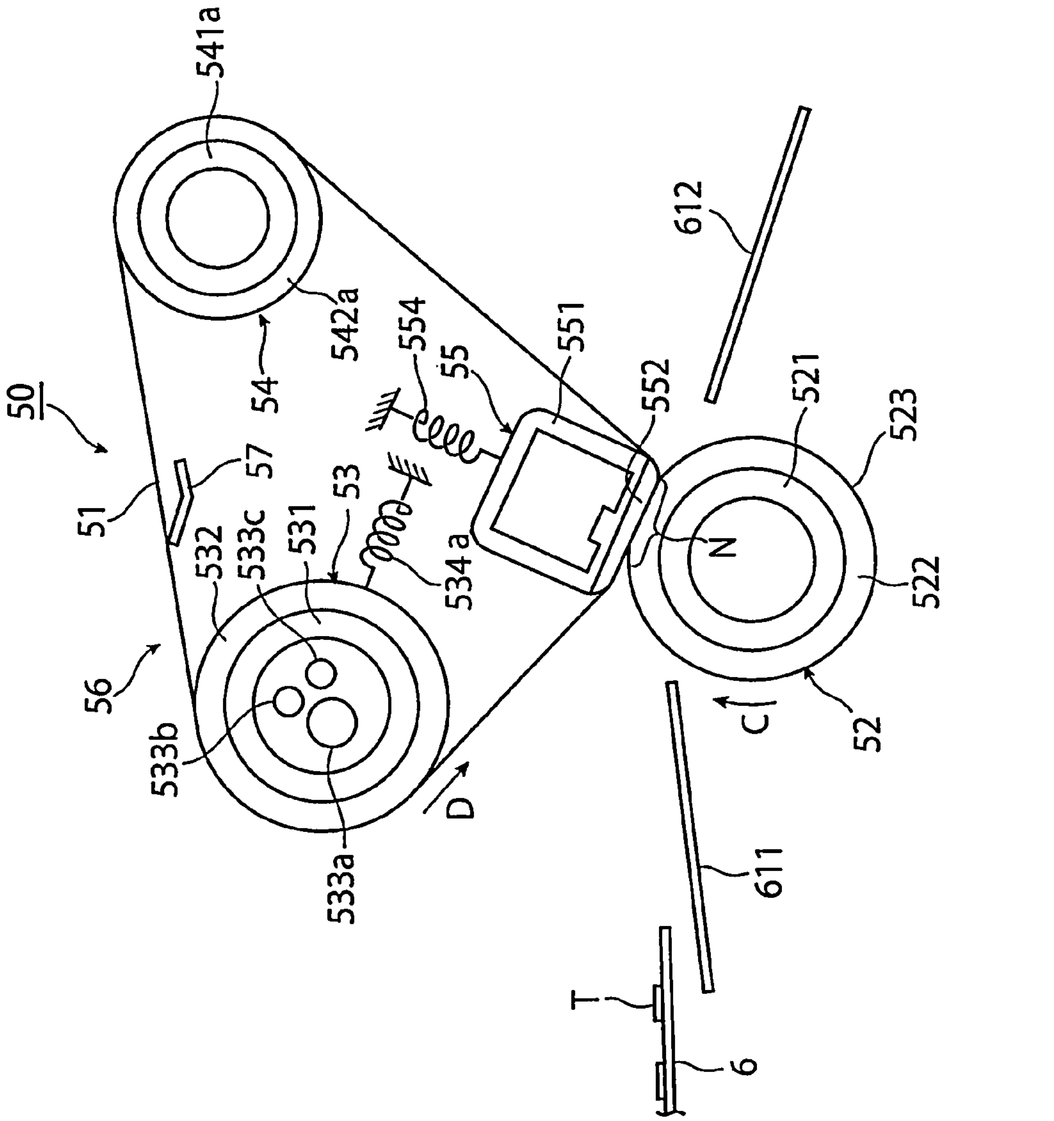
FIG. 2 is a diagram of the fixing device according to the first exemplary embodiment of the present disclosure.

As illustrated in FIG. 2, the fixing device 50 in the first exemplary embodiment roughly includes the heating belt 51 serving as an example of an endless belt, and the pressing roller 52 serving as an example of a pressing member that comes into pressure contact with the heating belt 51. The heating belt 51 is rotatably (circularly movably) stretched with an intended tension around the outer circumferential surfaces of an internal heating roller 53 (a first stretching roller), a steering roller 54 (a second stretching roller) serving as an example of a corrector, and a pressing pad 55 (a pressing member). The internal heating roller 53, the steering roller 54, and the pressing pad 55 serve as examples of multiple stretchers disposed on the inner circumferential surface of the heating belt 51. The multiple stretchers are not limited to the above combination of the internal heating roller 53, the steering roller 54, and the pressing pad 55, but may be a combination of the internal heating roller 53 and the steering roller 54, or a combination of four or more stretchers including, for example, another internal heating roller, an external heating roller, or a stretching roller. The steering roller 54 corresponds to one of the multiple stretchers that is displaced to correct positional deviation of the heating belt 51. The heating belt 51, the internal heating roller 53, the steering roller 54 and the pressing pad 55 constitute a heating belt module 56 serving as an example of a belt transport device. Instead of the pressing pad 55, a rotatable roller may be used as a stretcher. The heating belt 51 is stretched by the internal heating roller 53, the steering roller 54, and the pressing pad 55 to rotate in the rotation direction D in which the heating belt 51 moves during the fixing process.

Figure 3:
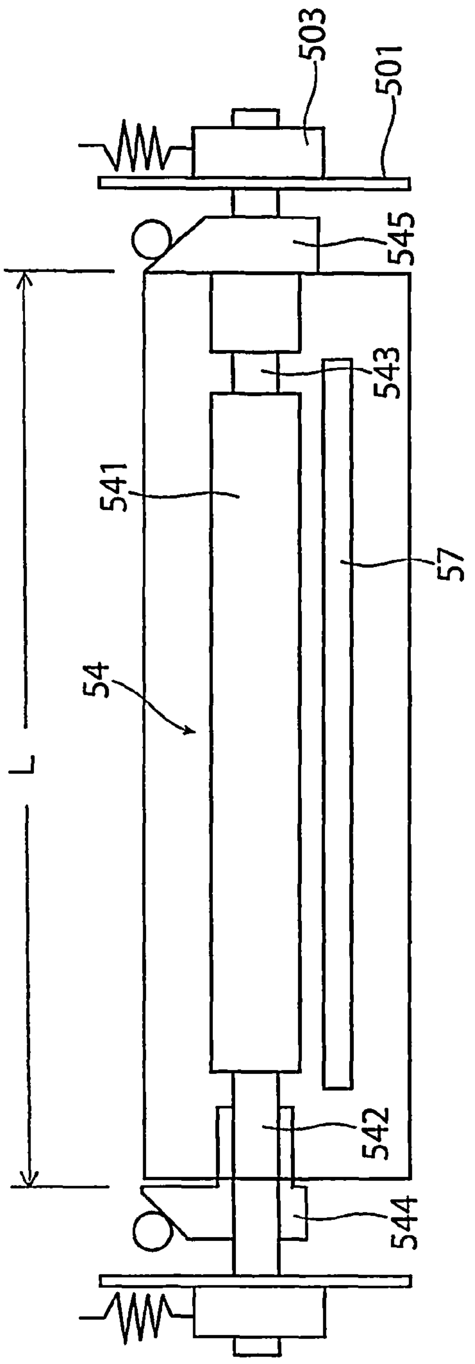
FIG. 3 is a diagram of a walk corrector of a belt.

The heating belt module 56 includes a contact member 57 between the internal heating roller 53 and the steering roller 54. The contact member 57 is formed from, for example, a wick that comes into contact with the inner circumferential surface of the heating belt 51 to clean the inner circumferential surface and supplies a lubricant. Examples of the lubricant include silicone oil. As illustrated in FIG. 3, the contact member 57 has a dimension in the width direction (the axial direction of the steering roller 54), or a direction crossing the movement direction of the heating belt 51, shorter than the full width of the heating belt 51 by an intended dimension.

When the full width of the contact member 57 is equal to or slightly shorter than the dimension of the heating belt 51 in the width direction, and when a walking phenomenon in which the heating belt 51 shifts to an edge portion in the width direction occurs, an edge portion of the contact member 57 may be exposed from or located close to the edge portion of the heating belt 51, and the lubricant may transfer to the surface of the heating belt 51 and stain the recording sheet 6. The contact member 57 is thus shorter than the full width of the heating belt 51 to avoid this.

The heating belt 51 is a flexible endless belt. The heating belt 51 includes a base layer, an elastic layer coated on the surface of the base layer, and a surface layer coated on the surface of the elastic layer.

The base layer is formed from a thermoresistant synthetic resin such as a polyimide resin, a polyamide resin, or a polyamide-imide resin, or a metal such as stainless steel, nickel, or copper. The base layer preferably has a thickness of equal to or larger than 10 μm and equal to or smaller than 100 μm, more preferably, equal to or larger than 20 μm and equal to or smaller than 60 μm.

The elastic layer is formed from a thermoresistant elastic material such as silicone rubber or fluorocarbon rubber. The elastic layer preferably has a thickness of equal to or larger than 30 μm and equal to or smaller than 600 μm, more preferably, equal to or larger than 100 μm and equal to or smaller than 500 μm.

The surface layer is formed from a material such as perfluoroalkoxy alkanes (PFA) or polytetrafluoroethylene (PTFE). The surface layer preferably has a thickness of equal to or smaller than 100 μm, more preferably, equal to or larger than 5 μm and equal to or smaller than 50 μm, or particularly preferably, equal to or larger than 10 μm and equal to or smaller than 40 μm.

As appropriate, an adhesion layer not illustrated is interposed between the base layer and the elastic layer.

The heating belt 51 is in pressure contact with the pressing roller 52 at an area wound around the outer circumferential surface of the pressing pad 55. The pressure contact portion where the heating belt 51 and the pressing pad 55 are in pressure contact constitutes a fixing nip N through which the recording sheet 6 passes while holding the unfixed toner image T.

A planar first guide member 611 that guides the recording sheet 6 carrying the unfixed toner image T to the fixing nip N is disposed at the entrance of the fixing nip N in the direction in which the recording sheet 6 is transported. A planar second guide member 612 that guides the recording sheet 6 to which the unfixed toner image T is fixed to the outside of the fixing device 50 is disposed at the exit of the fixing nip N in the direction in which the recording sheet 6 is transported.

The exit of the fixing nip N has a recessed shape with respect to the surface of the pressing roller 52 to suddenly change the pressing force of the heating belt 51 to release, from the surface of the heating belt 51 using the stiffness of the recording sheet 6 and the curvature of the heating belt 51, the recording sheet 6 subjected to fixing at the fixing nip N where the heating belt 51 and the pressing pad 55 are in pressure contact.

A release support member such as a release pick not illustrated that forcefully releases the recording sheet 6 from the surface of the heating belt 51 may be disposed at the exit of the fixing nip N.

The internal heating roller 53 includes a hollow cylindrical core 531 formed from a metal such as stainless steel, aluminum, or iron (a thin-walled high strength steel pipe), and a coat layer 532 formed from, for example, a thermoresistant synthetic resin or a thermoresistant elastic material, such as thermoresistant silicone rubber or fluorocarbon rubber, coated on the outer circumferential surface of the core 531 with a uniform thickness. The internal heating roller 53 has its outer circumferential surface with a cylindrical shape. As appropriate, a release layer formed from, for example, perfluoroalkoxy alkanes (PFA) or polytetrafluoroethylene (PTFE) may be disposed on the surface of the coat layer 532 of the internal heating roller 53. Multiple (three in the illustrated example) halogen lamps 533*a*, 533*b*, and 533*c* are disposed as examples of heating units (heat sources) inside the internal heating roller 53. The three halogen lamps 533*a*, 533*b*, and 533*c* each have a heating area appropriately set in accordance with, for example, the size in the direction crossing the direction in which the recording sheet 6 is transported.

The internal heating roller 53 presses the heating belt 51 outward in the radial direction from the inside of the heating belt 51 using a first coil spring 534*a* serving as a first urging member to apply an intended tension to the heating belt 51.

As in the internal heating roller 53, the steering roller 54 includes a hollow cylindrical core 541*a* formed from a metal such as stainless steel, aluminum, or iron (a thin-walled high strength steel pipe), and a coat layer 542*a* formed from, for example, a thermoresistant synthetic resin or a thermoresistant elastic material, such as thermoresistant silicone rubber or fluorocarbon rubber, coated on the outer circumferential surface of the core 541*a* with a uniform thickness. The steering roller 54 has an outer circumferential surface with a cylindrical shape. As appropriate, a release layer formed from, for example, perfluoroalkoxy alkanes (PFA) or polytetrafluoroethylene (PTFE) may be disposed on the surface of the coat layer 542*a* of the steering roller 54. The steering roller 54 has a smaller outer diameter than the internal heating roller 53. The steering roller 54 may naturally include a heating unit (heat source) inside.

As illustrated in FIG. 2, the pressing pad 55 is formed from, for example, a stiff material such as aluminum, stainless steel, iron, or synthetic resin, and has a cross section with a substantially angular hollow or solid tube shape. The pressing pad 55 is integrally formed from, for example, a metal such as aluminum, stainless steel, or iron. However, the material of the pressing pad 55 is not limited to these, and may be a combination of two or more materials, such as a combination of metals each including aluminum, stainless steel, and iron, or a combination of a synthetic resin and a metal such as aluminum, stainless steel, or iron. In the present exemplary embodiment, the pressing pad 55 includes a pad body 551 having a cross section of a substantially angular hollow tube and formed from a metal such as aluminum, stainless steel, or iron, and a pressing member 552 disposed on the pad body 551 to face the pressing roller 52.

The pressing member 552 is formed from a thermoresistant and stiff synthetic resin such as polyphenylenesulfide (PPS), polyimide, polyester, or polyamide, or a metal such as iron, aluminum, or stainless steel.

The pressing pad 55 presses the heating belt 51 with a second coil spring 554 serving as a second urging member with an intended pressing force against the outer circumferential surface of the pressing roller 52 from the inner side of the heating belt 51.

The internal heating roller 53 has its surface temperature detected by multiple temperature sensors not illustrated serving as examples of temperature detecting members. The internal heating roller 53 heats the surface of the heating belt 51 to an intended fixing temperature (for example, between 170° C. to 190° C.) by controlling the current fed to the halogen lamps 533*a*, 533*b*, and 533*c* based on the detection results from the temperature sensors using a temperature control circuit including, for example, a triode AC switch (TRIAC) not illustrated.

The pressing roller 52 includes a hollow or solid cylindrical core 521 formed from a metal such as stainless steel, aluminum, or iron (a thin-walled high strength steel pipe), an elastic layer 522 formed from a thermoresistant elastic material such as silicone rubber or fluorocarbon rubber coated on the outer circumferential surface of the core 521, and a release layer 523 formed from, for example, perfluoroalkoxy alkanes (PFA) or polytetrafluoroethylene (PTFE) coated on the outer circumferential surface of the elastic layer.

The pressing roller 52 is rotatably supported by a frame of the fixing device 50 not illustrated with a bearing member interposed therebetween. The pressing roller 52 is driven to rotate in an arrow direction C by a driving member not illustrated. The pressing roller 52 is movable in a direction to be in contact with or away from the pressing pad 55 in the heating belt module 56 by a contact/separation member not illustrated.

While being in pressure contact with the outer circumferential surface of the pressing roller 52, the heating belt 51 is driven to rotate at a uniform speed in an arrow direction D with rotation of the pressing roller 52.

In the fixing device 50 with this structure, a walking phenomenon where the heating belt 51 shifts toward the edge portion in the direction crossing the movement direction of the heating belt 51 occurs due to various causes such as variation of the layer thickness of the heating belt 51, initial variation of the positional accuracy of the internal heating roller 53, the steering roller 54, and the pressing pad

55 that stretch the heating belt 51, and displacement of the internal heating roller 53, the steering roller 54, and the pressing pad 55 resulting from the temperature changes.

As illustrated in FIG. 3, the fixing device 50 in the first exemplary embodiment includes a corrector that corrects, when the heating belt 51 causes a walking phenomenon, the walking phenomenon by tilting the steering roller 54 in a direction crossing the movement direction of the heating belt 51, to prevent the edge portion of the heating belt 51 in the width direction from coming into contact with a restricting member and being damaged.

As illustrated in FIGS. 2 and 3, the corrector includes the steering roller 54 constituting part of the corrector. The steering roller 54 has both edge portions in its axial direction supported to be movable in the direction crossing the movement direction of the heating belt 51.

Figure 4:
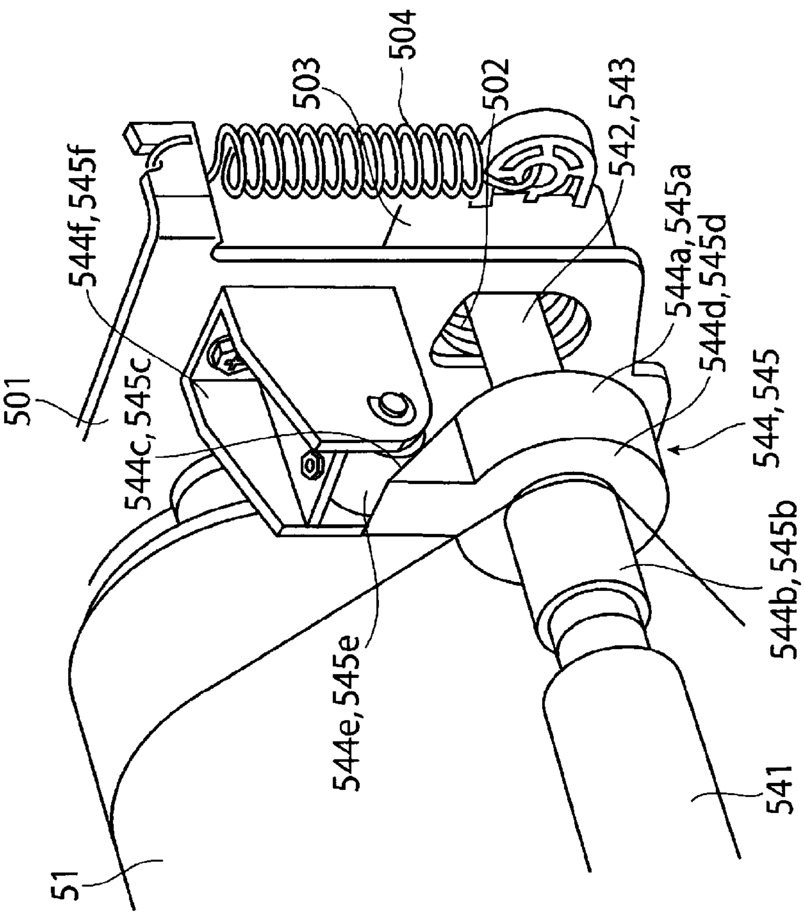
FIG. 4 is a perspective diagram of a related portion of the walk corrector of the belt.

As illustrated in FIGS. 3 and 4, the steering roller 54 includes a hollow or solid cylindrical tensioning portion 541 that stretches the heating belt 51, rotation shafts 542 and 543 that extend through the tensioning portion 541 or are unrotatably stopped at both edge portions in the longitudinal direction, and pulleys 544 and 545 separately disposed at both edge portions of the tensioning portion 541. A distance L between the inner end surfaces of the left and right pulleys 544 and 545 is equal to or larger than the dimension (width) of the heating belt 51 in the direction crossing the movement direction of the heating belt 51. The heating belt 51 is normally stretched while having its edge surfaces in the width direction in contact with or apart from the end surfaces of the pulleys 544 and 545. The pulleys 544 and 545 are respectively attached to the rotation shafts 542 and 543 in the steering roller 54 to keep the illustrated state while being independent from the rotation shafts 542 and 543, that is, without rotating together with the rotation shafts 542 and 543.

As illustrated in FIG. 4, the pulleys 544 and 545 are each formed from a metal or a rigid synthetic resin with a disc shape and an intended thickness. The pulleys 544 and 545 respectively include disc-shaped disc portions 544*a* and 545*a*, hollow cylindrical portions 544*b* and 545*b* disposed on the inner side of the disc portions 544*a* and 545*a* in the axial direction, inclined surface portions 544*c* and 545*c* disposed on the outer circumferential surfaces of the disc portions 544*a* and 545*a* to protrude outward in the radial direction and having a substantially triangular prism shape when viewed sideways, and end surfaces 544*d* and 545*d* disposed at the inner end portions of the pulleys 544 and 545 in the axial direction to be perpendicular to the rotation shafts 542 and 543 of the steering roller 54 and having a relatively large diameter. The end surfaces 544*d* and 545*d* of the pulleys 544 and 545 have outer diameters larger than the outer diameter of the tensioning portion 541 of the steering roller 54, and serve as flange portions with which the edge surfaces of the heating belt 51 come into contact. When the heating belt 51 shifts in the axial direction of the steering roller 54, the edge surfaces of the heating belt 51 come into contact with the end surfaces 544*d* and 545*d* of the pulleys 544 and 545 to push the pulleys 544 and 545. The inclined surfaces 544*d* and 545*d* of the pulleys 544 and 545 have an inclination angle with respect to the rotation shafts 542 and 543 of, for example, approximately 60 degrees, but the inclination angle may be smaller or approximately 30 to 45 degrees, or larger or approximately 70 to 80 degrees.

As illustrated in FIG. 4, rollers 544*e* and 545*e* that come into contact with the inclined surfaces 544*c* and 545*c* of the pulleys 544 and 545 are rotatably disposed on a body frame 501 of the fixing device 50 formed from, for example, a metal plate. The rollers 544*e* and 545*e* are rotatably disposed on support members 544*f* and 545*f* fixed to the body frame 501 in the fixing device 50.

The steering roller 54 is attached to the body frame 501 in the fixing device 50 to be movable in the direction crossing the movement direction of the heating belt 51 through long holes 502 in the body frame 501. The edge portions of the rotation shafts 542 and 543 in the steering roller 54 are rotatably supported by bearing members 503 disposed on the outer side of the body frame 501. The bearing members 503 are urged upward in the drawing by coil springs 504 each having one end portion coupled to the corresponding bearing member 503 to constantly bring the inclined surfaces 544*c* and 545*c* of the pulleys 544 and 545 into contact with the rollers 544*e* and 545*e*. The other end portion of each coil spring 504 is locked on the body frame 501.

Figure 5:
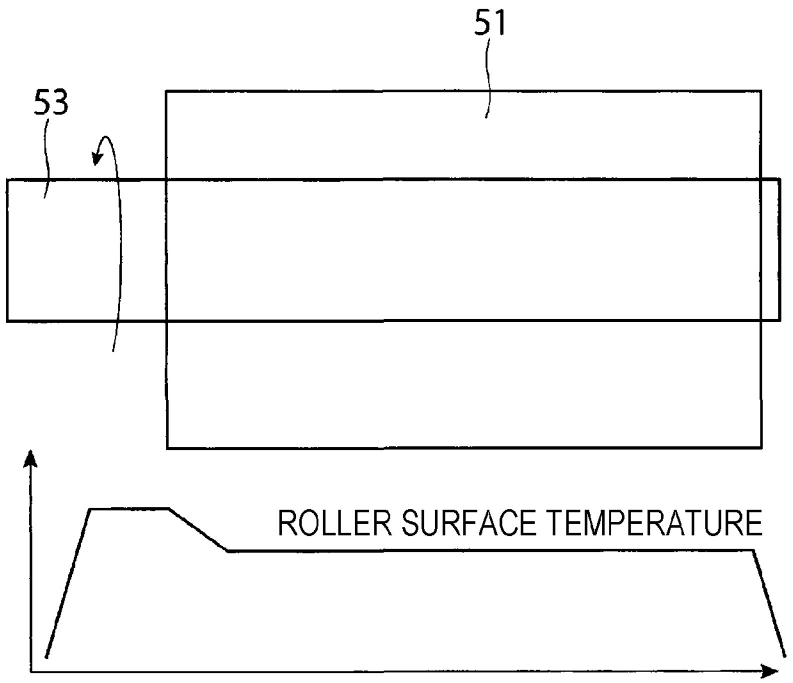
FIG. 5 is a diagram of a surface temperature of an internal heating roller when a heating belt has caused walking.

When a walking phenomenon where the heating belt 51 shifts toward the edge portion in the axial direction of the steering roller 54 occurs, as illustrated in FIG. 5, the heating belt 51 shifts toward one edge portion in the width direction, and the edge portion of the heating belt 51 comes into contact with the end surface 544*d* or 545*d* of the pulley 544 or 545. When the heating belt 51 shifts further toward the edge portion in the width direction, the edge portion of the heating belt 51 pushes the pulley 544 or 545 outward in the axial direction.

Then, the inclined surface portion 544*c* or 545*c* of the pulley 544 or 545 is pushed down by the roller 544*e* or 545*e* disposed closer to the body frame 501, and the steering roller 54 is inclined to move a portion brought into contact with the edge portion of the heating belt 51, as illustrated in FIG. 5, downward in the drawing with respect to the center portion in the axial direction. At this time, the other edge portion of the steering roller 54 moves opposite or upward in the drawing with respect to the center portion in the axial direction.

Thus, the edge portion of the heating belt 51 stretched by the steering roller 54 inclined downward in the drawing has a larger tension than the center portion, and exerts a force of moving away from the edge portion in the width direction. Then, the heating belt 51 stops at the position where the force of moving toward the edge portion in the width direction is evenly balanced with the force of moving away from the edge portion in the width direction resulting from the inclination of the steering roller 54. Thus, the walking phenomenon caused in the heating belt 51 is avoided or reduced.

The position of the heating belt 51 where a walking phenomenon is avoided or reduced may be the position where the heating belt 51 remains in contact with the end surface 544*d* or 545*d* of the pulley 544 or 545.

As illustrated in FIG. 5, when the fixing device 50 with the above structure causes a walking phenomenon where the heating belt 51 shifts toward the edge portion in the width direction, the edge portion of the heating belt 51 opposite to the edge portion toward which the heating belt 51 shifts is more likely to raise its temperature, which causes a toner offset at only the edge portion at which gloss varies or the temperature rises to lower the image quality.

Simply turning on or off of heating of the halogen lamps 533*a*, 533*b*, and 533*c* in the internal heating roller 53 in accordance with the size of the recording sheet 6 fails to address such a temperature rise at only one edge portion of the heating belt 51 in the width direction when a walking phenomenon occurs in the heating belt 51.

To address this, the fixing device according to the first exemplary embodiment includes a switch that switches the area heated by the heater in accordance with the position of the edge portion of the belt in the direction crossing the movement direction of the belt.

The fixing device according to the first exemplary embodiment also includes a corrector that displaces one of the stretchers to correct the positional deviation of the belt, and the switch switches the area heated by the heater in accordance with the operation of the corrector.

In the fixing device according to the first exemplary embodiment, the heater includes first and second edge heaters that heat both edge portions of the belt in the direction crossing the movement direction of the belt, and the switch switches the first and second edge heaters one from the other in accordance with the operation of the corrector.

Figure 6:
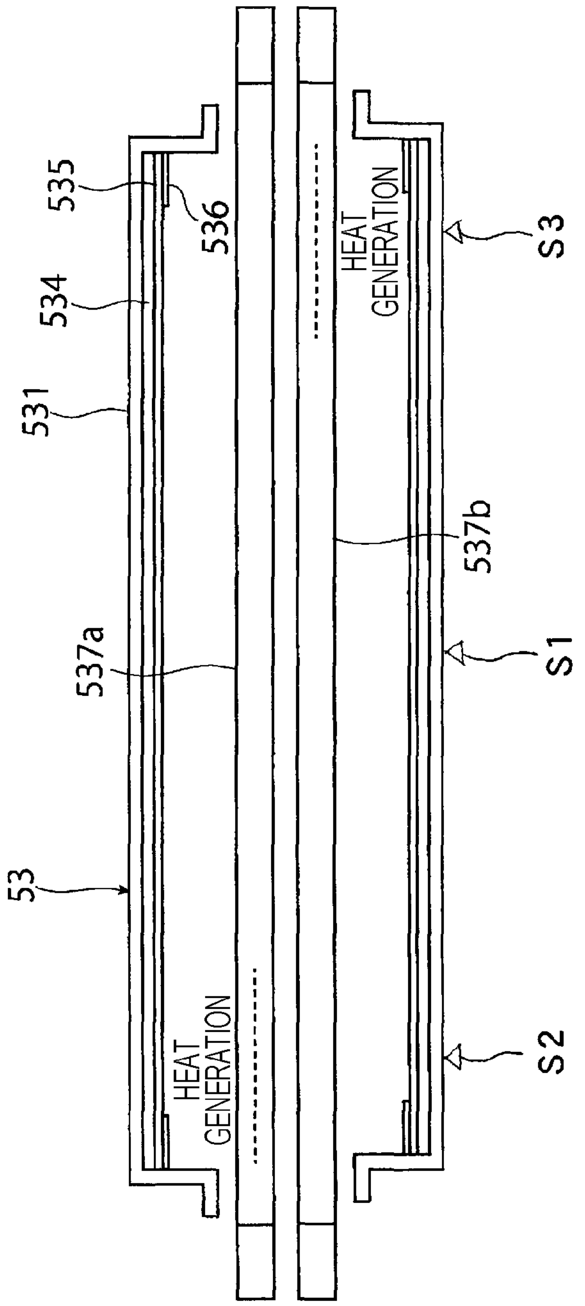
FIG. 6 is a cross-sectional diagram of the internal heating roller.

More specifically, as illustrated in FIG. 6, the internal heating roller 53 in the fixing device 50 in the first exemplary embodiment includes a hollow cylindrical core 531 formed from a metal such as stainless steel, aluminum, or iron (a thin-walled high strength steel pipe), an insulation layer 534 formed from a material such as glass or a heat-resistant synthetic resin such as polyimide disposed on the inner circumferential surface of the core 531, a heating layer 535 formed from a material such as carbon or AgPd disposed on the inner circumferential surface of the insulation layer 534, first electrodes 536 disposed on both edge portions of the heating layer 535 in the longitudinal direction for carrying electricity, and multiple (two in the drawing) halogen lamps 537*a* and 537*b* disposed in the core 531 and serving as examples of heat sources to respectively heat different edge portions of the internal heating roller 53 opposite to each other in the longitudinal direction.

The internal heating roller 53 generates heat throughout the area in the longitudinal direction using the heating layer 535 to heat the heating belt 51 from the inner circumferential surface, and to individually heat the different edge portions in the longitudinal direction with the two halogen lamps 537*a* and 537*b*. This structure employs the heating layer 535 serving as a main heating layer instead of the above three halogen lamps. Instead of the full area in the longitudinal direction, the heating layer 535 may heat a center portion other than the edge portions heated by the two halogen lamps 537*a* and 537*b*. In the exemplary embodiment, in the case, for example, where the heating layer 535 alone fails to fully heat the edge portions, the two halogen lamps 537*a* and 537*b* are auxiliary turned on to uniformly heat the internal heating roller 53 in the longitudinal direction. The time for which the two halogen lamps 537*a* and 537*b* are turned on may be controlled to allow the halogen lamps 537*a* and 537*b* to generate heat and to allow either one of the halogen lamps 537*a* and 537*b* to generate more or less heat than the other.

The internal heating roller 53 is not limited to the one illustrated in FIG. 6, including the insulation layer that heats the full area and the two halogen lamps 537*a* and 537*b* that individually and simply heat the edge portions in the longitudinal direction.

Figure 7:
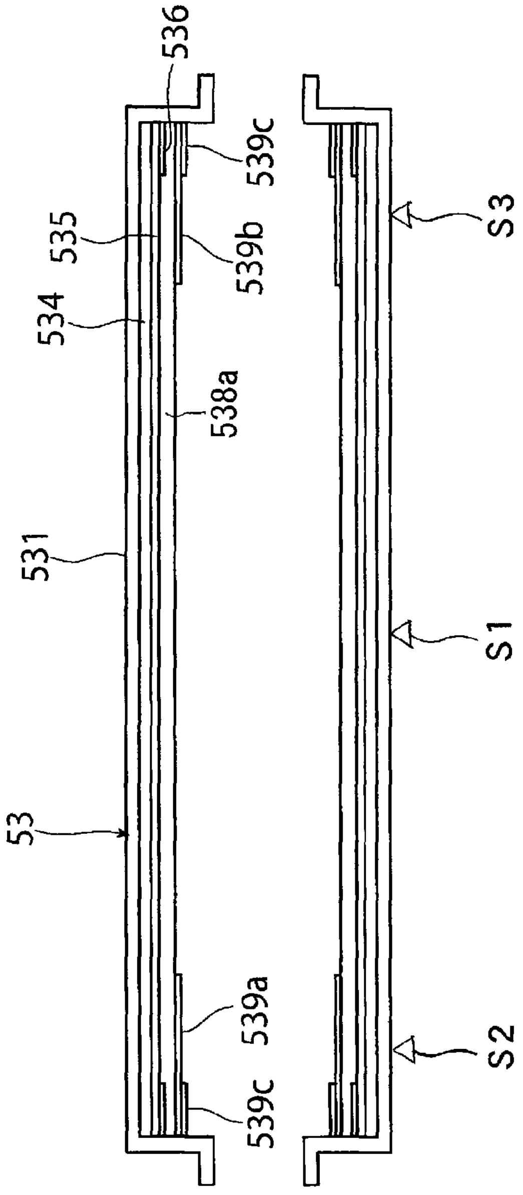
FIG. 7 is a cross-sectional diagram of the internal heating roller.

As illustrated in FIG. 7, the internal heating roller 53 may include a hollow cylindrical core 531 formed from a metal such as stainless steel, aluminum, or iron (a thin-walled high strength steel pipe), the insulation layer 534 formed from a material such as glass or a heat-resistant synthetic resin such as polyimide disposed on the inner circumferential surface of the core 531, the main heating layer 535 formed from a material such as carbon or AgPd disposed on the inner circumferential surface of the insulation layer 534 and generating heat throughout in the longitudinal direction, first electrodes 536 disposed on both edge portions of the main heating layer 535 in the longitudinal direction for carrying electricity, an insulation layer 538*a* formed from a material such as glass or a heat-resistant synthetic resin such as polyimide disposed on the inner circumferential surface of the main heating layer 535, first and second auxiliary heating layers 539*a* and 539*b* formed from a material such as carbon or AgPd and disposed on respective edge portions of the inner circumferential surface of the insulation layer 538*a* in the longitudinal direction, and second electrodes 539*c* disposed on edge portions of the first and second auxiliary heating layers 539*a* and 539*b* in the longitudinal direction for carrying electricity. The second electrodes 539*c* for carrying electricity may be disposed at both edge portions of the first auxiliary heating layer 539*a* in the longitudinal direction and both edge portions of the second auxiliary heating layer 539*b* in the longitudinal direction.

The internal heating roller 53 generates heat throughout the area in the longitudinal direction using the main heating layer to heat the heating belt 51 from the inner circumferential surface, and individually turns on the first and second auxiliary heating layers 539*a* and 539*b* to individually and simply heat different edge portions in the longitudinal direction. While generating heat, the first and second auxiliary heating layers 539*a* and 539*b* are capable of controlling the amount of current or the time for the passage of the electric current to allow either one of the first and second auxiliary heating layers 539*a* and 539*b* to generate more heat than the other.

FIG. 6 and FIG. 7 illustrate temperature sensors S1 to S3 that detect the temperature at the center portion and both edge portions of the internal heating roller 53 in the longitudinal direction.

Figure 8:
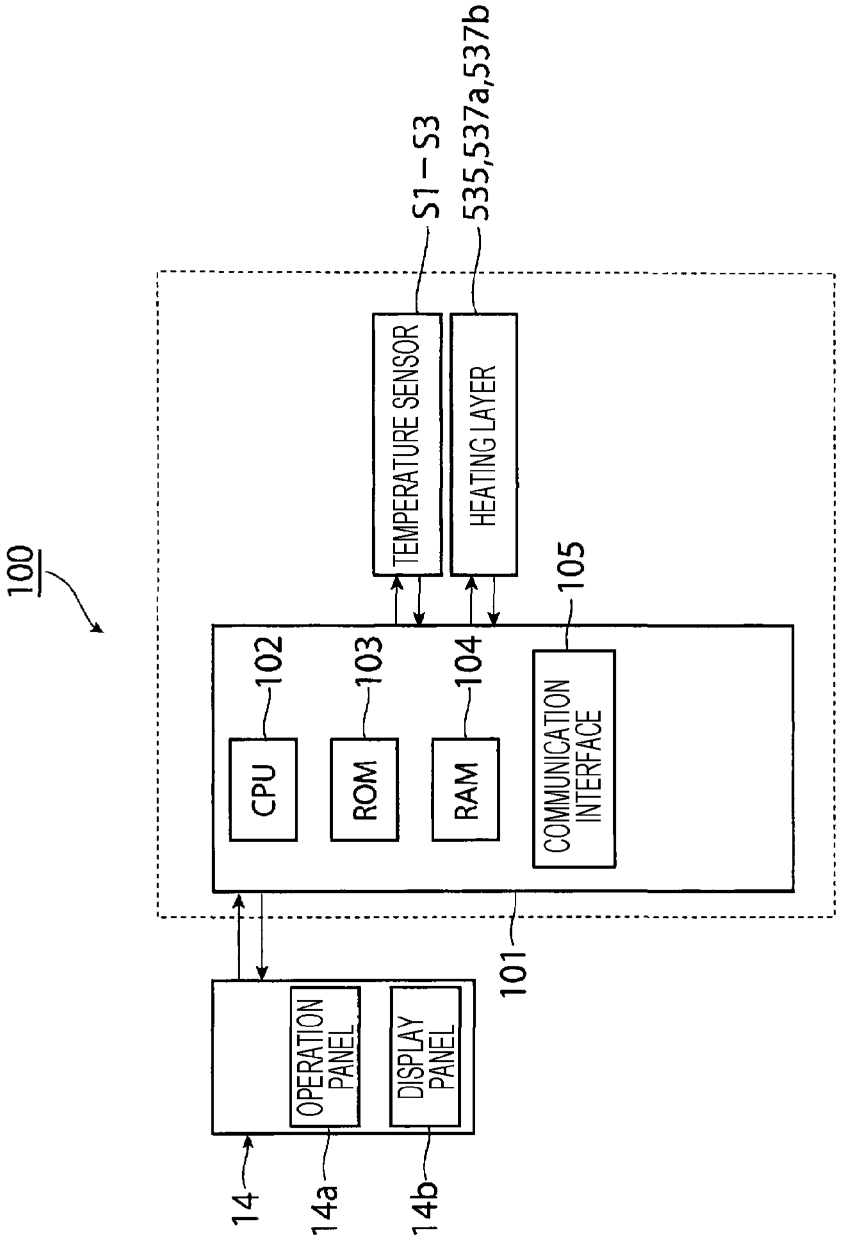
FIG. 8 is a block diagram of a control device of an image forming apparatus according to the first exemplary embodiment of the present disclosure.

FIG. 8 is a block diagram of the controller 100 in the image forming apparatus.

In FIG. 8, a control unit 101 serves as an example of a control member (switch) of the controller 100 that generally controls the operation of the image forming apparatus 1. The control unit 101 includes, for example, a central processing unit (CPU) 102 that generally controls the image forming operation and functions as a changing member, a read only memory (ROM) 103 that stores, for example, a control program executed by the CPU 102, a random access memory (RAM) 104 that stores, for example, parameters used in the control program executed by the CPU 102, and a communication interface 105 that communicates with a bus, not illustrated, that connects components such as the CPU 102 and the ROM 103 to each other, an external personal computer, and an image reading device.

The control unit 101 receives, from the operating device 14 as appropriate, inputs of image forming conditions such as the size or type of the recording sheet 6 on which an image is formed, the number of sheets to be printed, and one-side printing or both-side printing. The control unit 101 performs a control operation of switching the passage of electricity to the main heating layer 535 and the two halogen lamps 537*a* and 537*b* in the internal heating roller 53 in the fixing device 50, or the main heating layer 535 and the first and second auxiliary heating layers 539*a* and 539*b* depending on the detection results from the temperature sensors S1 to S3 to switch the area to be heated by these heaters.

The fixing device according to the first exemplary embodiment with the above structure is capable of reducing, when the belt shifts to the edge portion in the direction crossing the movement direction, a temperature rise at the edge portion opposite to the edge portion toward which the belt shifts in the following manner.

As illustrated in FIG. 2, when the fixing device 50 in the first exemplary embodiment performs a fixing operation on the recording sheet, the heating layer and the main heating layer in the internal heating roller are turned on to heat the internal heating roller, and the internal heating roller heats the heating belt 51 from the inner surface of the heating belt 51.

The internal heating roller 53 may have a function of switching the heating area in accordance with the dimension (size) of the recording sheet 6 in the direction crossing the transport direction. However, for ease of illustration, the internal heating roller 53 in this case generates heat throughout the area in the direction crossing the transport direction of the recording sheet 6.

As illustrated in FIG. 5, in the fixing device 50 with this structure, when a walking phenomenon where the heating belt 51 shifts toward the edge portion in the width direction occurs, the edge portion of the heating belt 51 opposite to the edge portion toward which the heating belt 51 shifts is likely to raise its temperature. Simply at the edge portion where the temperature rises or the gloss varies, a toner offset may occur and lower the image quality.

As illustrated in FIG. 6 and FIG. 7, in the fixing device 50 in the first exemplary embodiment, when the temperature sensors S1 to S3 disposed on the surface of the internal heating roller 53 detect that one edge portion of the internal heating roller 53 in the longitudinal direction has a higher temperature than the other edge portion, the controller 100 determines an occurrence of a walking phenomenon in the heating belt 51, and determines that the edge portion toward which the heating belt 51 shifts is an edge portion is disposed away from any of the temperature sensors S1 to S3 that has detected a relatively high temperature.

The controller 100 then reduces the amount of current or the time for turning on the first and second auxiliary heating layers 539*a* and 539*b* or the halogen lamps 537*a* and 537*b* located opposite to the edge portion toward which the heating belt 51 has shifted to reduce the heat generated by the internal heating roller 53 located opposite to the portion where the walking phenomenon has occurred, and to reduce a temperature rise at the edge portion of the heating belt 51 opposite to the edge portion toward which the heating belt 51 has shifted and opposite to the portion where the walking phenomenon has occurred. The controller 100 is thus capable of avoiding or reducing an occurrence of toner offset simply at the edge portion where the gloss varies or the temperature rises and degradation of the image quality.

The exemplary embodiment has described a case where an unfixed toner image is to be fixed on a recording sheet, but this is not the only possible example. The present disclosure is naturally applicable to fixing of an object other than an unfixed toner image.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A fixing device comprising:
an endless belt;
a plurality of stretchers that stretch the belt;
a heater that heats the belt including sections, section by section, sectioned in a direction crossing a rotation direction of the belt; and
a switch that switches the sections heated by the heater from one to another in accordance with a position of an edge portion of the belt in the direction crossing the rotation direction of the belt.

(((2)))

The fixing device according to (((1))), further comprising:
a corrector that moves one of the plurality of stretchers to correct positional deviation of the belt,
wherein the switch switches the sections heated by the heater from one to another in accordance with an operation of the corrector.

(((3)))

The fixing device according to (((2))),
wherein the heater includes first and second edge heaters that respectively heat two edge portions of the belt in the direction crossing the rotation direction of the belt, and
wherein the switch switches the first and second edge heaters from one to another in accordance with an operation of the corrector.

(((4)))

The fixing device according to (((1))),
wherein the switch varies an amount of heat generated by the heater at a first edge portion of the belt in the direction crossing the rotation direction of the belt from an amount of heat generated at a second edge portion of the belt in accordance with the position of the edge portion of the belt in the direction crossing the rotation direction of the belt.

(((5)))

The fixing device according to (((4))),
wherein the switch increases the amount of heat generated by the heater located at the first edge portion of the belt in the direction crossing the rotation direction of the belt further than the amount of heat generated at the second edge portion of the belt.

(((6)))

The fixing device according to (((4))),
wherein the switch reduces the amount of heat generated by the heater located opposite to the first edge portion of the belt in the direction crossing the rotation direction of the belt further than the amount of heat generated at the second edge portion of the belt.

(((7)))

The fixing device according to (((2))),
wherein the corrector comes into contact with the edge portion of the belt in the direction crossing the rotation direction of the belt and tilts a stretched portion of the belt to increase tension on the belt and correct positional deviation of the belt.

(((8)))

The fixing device according to (((7))),
wherein the corrector includes:
a hollow cylindrical tensioning member that stretches the belt;
contact members disposed on two edge portions of the tensioning member in an axial direction of the tensioning member; and inclined surfaces disposed on outer surfaces of the contact members in axial directions of the contact members to come into contact with fixed restricting members to tilt the tensioning member in a direction crossing an axial direction of the tensioning member.

(((9)))

An image forming apparatus, comprising:

an image forming unit that forms an image on a surface of a recording medium; and a fixing unit that fixes the image formed on the surface of the recording medium, wherein the fixing device according to any one of (((1))) to (((8))) serves as the fixing unit.

What is claimed is:

1. A fixing device comprising:

an endless belt;

a plurality of stretchers that stretch the belt;

a heater that heats the belt including sections, section by section, sectioned in a direction crossing a rotation direction of the belt; and a switch that switches the sections heated by the heater from one to another in accordance with a position of an edge portion of the belt in the direction crossing the rotation direction of the belt.

2. The fixing device according to claim 1, further comprising:

a corrector that moves one of the plurality of stretchers to correct positional deviation of the belt, wherein the switch switches the sections heated by the heater from one to another in accordance with an operation of the corrector.

3. The fixing device according to claim 2, wherein the heater includes first and second edge heaters that respectively heat two edge portions of the belt in the direction crossing the rotation direction of the belt, and wherein the switch switches the first and second edge heaters from one to another in accordance with the operation of the corrector.

4. The fixing device according to claim 1, wherein the switch varies an amount of heat generated by the heater at a first edge portion of the belt in the direction crossing the rotation direction of the belt from an amount of heat generated at a second edge portion of the belt in accordance with the position of the edge portion of the belt in the direction crossing the rotation direction of the belt.

5. The fixing device according to claim 4, wherein the switch increases the amount of heat generated by the heater located at the first edge portion of the belt in the direction crossing the rotation direction of the belt further than the amount of heat generated at the second edge portion of the belt.

6. The fixing device according to claim 4, wherein the switch reduces the amount of heat generated by the heater located opposite to the first edge portion of the belt in the direction crossing the rotation direction of the belt further than the amount of heat generated at the second edge portion of the belt.

7. The fixing device according to claim 2, wherein the corrector comes into contact with the edge portion of the belt in the direction crossing the rotation direction of the belt and tilts a stretched portion of the belt to increase tension on the belt and correct positional deviation of the belt.

8. The fixing device according to claim 7, wherein the corrector includes:

a hollow cylindrical tensioning member that stretches the belt;

contact members disposed on two edge portions of the tensioning member in an axial direction of the tensioning member; and inclined surfaces disposed on outer surfaces of the contact members in axial directions of the contact members to come into contact with fixed restricting members to tilt the tensioning member in a direction crossing an axial direction of the tensioning member.

9. An image forming apparatus, comprising:

an image forming unit that forms an image on a surface of a recording medium; and a fixing unit that fixes the image formed on the surface of the recording medium, wherein the fixing device according to claim 1 serves as the fixing unit.

10. An image forming apparatus, comprising:

an image forming unit that forms an image on a surface of a recording medium; and a fixing unit that fixes the image formed on the surface of the recording medium, wherein the fixing device according to claim 2 serves as the fixing unit.

11. An image forming apparatus, comprising:

an image forming unit that forms an image on a surface of a recording medium; and a fixing unit that fixes the image formed on the surface of the recording medium, wherein the fixing device according to claim 3 serves as the fixing unit.

12. An image forming apparatus, comprising:

an image forming unit that forms an image on a surface of a recording medium; and a fixing unit that fixes the image formed on the surface of the recording medium, wherein the fixing device according to claim 4 serves as the fixing unit.

13. An image forming apparatus, comprising:

an image forming unit that forms an image on a surface of a recording medium; and a fixing unit that fixes the image formed on the surface of the recording medium, wherein the fixing device according to claim 5 serves as the fixing unit.

14. An image forming apparatus, comprising:

an image forming unit that forms an image on a surface of a recording medium; and a fixing unit that fixes the image formed on the surface of the recording medium, wherein the fixing device according to claim 6 serves as the fixing unit.

15. An image forming apparatus, comprising:

an image forming unit that forms an image on a surface of a recording medium; and a fixing unit that fixes the image formed on the surface of the recording medium, wherein the fixing device according to claim 7 serves as the fixing unit.

16. An image forming apparatus, comprising:

an image forming unit that forms an image on a surface of a recording medium; and a fixing unit that fixes the image formed on the surface of the recording medium, wherein the fixing device according to claim 8 serves as the fixing unit.

17. A fixing device comprising:

an endless belt;

a plurality of stretching means for stretching the belt;

heating means for heating the belt including sections, section by section, sectioned in a direction crossing a rotation direction of the belt; and switching means for switching the sections heated by the heating means from one to another in accordance with a position of an edge portion of the belt in the direction crossing the rotation direction of the belt.

* * * * *